United States Patent
Kitamura et al.

(10) Patent No.: US 11,956,526 B2
(45) Date of Patent: Apr. 9, 2024

(54) IMAGE CAPTURING ELEMENT, IMAGE CAPTURING DEVICE AND METHOD

(71) Applicant: SONY GROUP CORPORATION, Tokyo (JP)

(72) Inventors: Takuya Kitamura, Tokyo (JP); Takefumi Nagumo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 326 days.

(21) Appl. No.: 17/297,051

(22) PCT Filed: Nov. 21, 2019

(86) PCT No.: PCT/JP2019/045557
§ 371 (c)(1),
(2) Date: May 26, 2021

(87) PCT Pub. No.: WO2020/116177
PCT Pub. Date: Nov. 6, 2020

(65) Prior Publication Data
US 2022/0030159 A1    Jan. 27, 2022

(30) Foreign Application Priority Data

Dec. 5, 2018   (JP) .................. 2018-228311

(51) Int. Cl.
*H04N 23/61* (2023.01)
*G06T 7/11* (2017.01)
*H04N 23/60* (2023.01)

(52) U.S. Cl.
CPC ............... *H04N 23/61* (2023.01); *G06T 7/11* (2017.01); *H04N 23/64* (2023.01); *G06T 2207/20112* (2013.01)

(58) Field of Classification Search
CPC .......... H04N 23/61; H04N 23/64; G06T 7/11; G06T 2207/20112
(Continued)

(56) References Cited

U.S. PATENT DOCUMENTS

| 2005/0062853 A1 | 3/2005 | Yagi et al. |
| 2008/0180534 A1* | 7/2008 | Murayama ............... G06T 7/254 348/208.4 |

(Continued)

FOREIGN PATENT DOCUMENTS

| AU | 2005276018 A | 3/2006 |
| BR | PI0514555 A | 6/2008 |

(Continued)

OTHER PUBLICATIONS

Extended European Search Report of EP Application No. 19892376.5, dated Feb. 4, 2022, 09 pages.

(Continued)

*Primary Examiner* — Joel W Fosselman
(74) *Attorney, Agent, or Firm* — CHIP LAW GROUP

(57) ABSTRACT

The present disclosure relates to an image capturing element, an image capturing device, and a method that are capable of preventing a reduction in communication safety. By capturing an image of a subject, and generating a captured image, a predetermined feature amount to be output to the outside is extracted from the generated captured image. For example, an image capturing section that captures an image of a subject to generate a captured image, and a feature amount extracting section that extracts, from the captured image generated by the image capturing section, a predetermined feature amount to be output to the outside, are packaged and are formed in respective substrates different from each other. The present disclosure can be applied to, for (Continued)

| METHOD 1 | IMAGE SENSOR WHICH EXTRACTS FEATURE AMOUNT FROM CAPTURED IMAGE, ENCODES FEATURE AMOUNT, AND OUTPUTS ENCODED DATA OF FEATURE AMOUNT |
|---|---|
| METHOD 1-1 | PACKAGING, AND EXTRACTING/ENCODING FEATURE AMOUNT IN LOGIC LAYER |
| METHOD 1-1-1 | HAVING FUNCTION OF SELECTING OPERATION MODE |
| METHOD 1-1-1-1 | HAVING AUTHENTICATION FUNCTION FOR REQUEST SOURCE |
| METHOD 1-1-2 | HAVING FUNCTION OF LIMITING IMAGE REGION TO BE OUTPUT BASED ON FEATURE AMOUNT IN CASE OF IMAGE OUTPUT MODE | example, an image capturing element, an image capturing device, an image processing device, a transmission device, or a communication device.

11 Claims, 15 Drawing Sheets

(58) Field of Classification Search
USPC .................................................. 348/222.1
See application file for complete search history.

(56) References Cited

U.S. PATENT DOCUMENTS

| | | |
|---|---|---|
| 2016/0210536 A1 | 7/2016 | Cho |
| 2018/0039882 A1 | 2/2018 | Ikeda et al. |
| 2019/0034748 A1 | 1/2019 | Matsumoto et al. |
| 2020/0226457 A1 | 7/2020 | Ikeda et al. |
| 2021/0105426 A1 | 4/2021 | Matsumoto et al. |

FOREIGN PATENT DOCUMENTS

| | | |
|---|---|---|
| CA | 2459220 A1 | 3/2003 |
| CA | 2578005 A1 | 3/2006 |
| CN | 1552040 A | 12/2004 |
| CN | 101006717 A | 7/2007 |
| CN | 105227914 A | 1/2016 |
| CN | 107113406 A | 8/2017 |
| CN | 108256031 A | 7/2018 |
| CN | 108781265 A | 11/2018 |
| CN | 109478557 A | 3/2019 |
| CN | 111526267 A | 8/2020 |
| DE | 112017003898 T5 | 4/2019 |
| EP | 1435588 A1 | 7/2004 |
| EP | 1788802 A1 | 5/2007 |
| EP | 3439288 A1 | 2/2019 |
| JP | 2003-078829 A | 3/2003 |
| JP | 2003244347 A | 8/2003 |
| JP | 2005277989 A | 10/2005 |
| JP | 2018-026812 A | 2/2018 |
| JP | 2018191230 A | 11/2018 |
| JP | 6540886 B2 | 7/2019 |
| JP | 6788757 B2 | 11/2020 |
| JP | 2021-108489 A | 7/2021 |
| KR | 10-2005-0025115 A | 3/2005 |
| KR | 10-2007-0053230 A | 5/2007 |
| KR | 10-2019-0032387 A | 3/2019 |
| KR | 10-2021-0134066 A | 11/2021 |
| MX | 2007002073 A | 4/2007 |
| RU | 2007106899 A | 8/2008 |
| TW | 583879 B | 4/2004 |
| TW | 201810134 A | 3/2018 |
| WO | 2003/023712 A1 | 3/2003 |
| WO | 2006/022077 A1 | 3/2006 |
| WO | 2017/168665 A1 | 10/2017 |
| WO | 2018/025116 A1 | 2/2018 |

OTHER PUBLICATIONS

International Search Report and Written Opinion of PCT Application No. PCT/JP2019/045557, dated Feb. 4, 2020, 09 pages of ISRWO.

"Information technology—Multimedia content description interface—Part 13: Compact descriptors for visual search", ISO/IEC DIS 15938-13, ISO/IEC JTC1/SC29/WG11, Sep. 2015, 7 pages.

* cited by examiner

FIG. 1

| METHOD 1 | IMAGE SENSOR WHICH EXTRACTS FEATURE AMOUNT FROM CAPTURED IMAGE, ENCODES FEATURE AMOUNT, AND OUTPUTS ENCODED DATA OF FEATURE AMOUNT |
|---|---|
| METHOD 1-1 | PACKAGING, AND EXTRACTING/ENCODING FEATURE AMOUNT IN LOGIC LAYER |
| METHOD 1-1-1 | HAVING FUNCTION OF SELECTING OPERATION MODE |
| METHOD 1-1-1-1 | HAVING AUTHENTICATION FUNCTION FOR REQUEST SOURCE |
| METHOD 1-1-2 | HAVING FUNCTION OF LIMITING IMAGE REGION TO BE OUTPUT BASED ON FEATURE AMOUNT IN CASE OF IMAGE OUTPUT MODE |

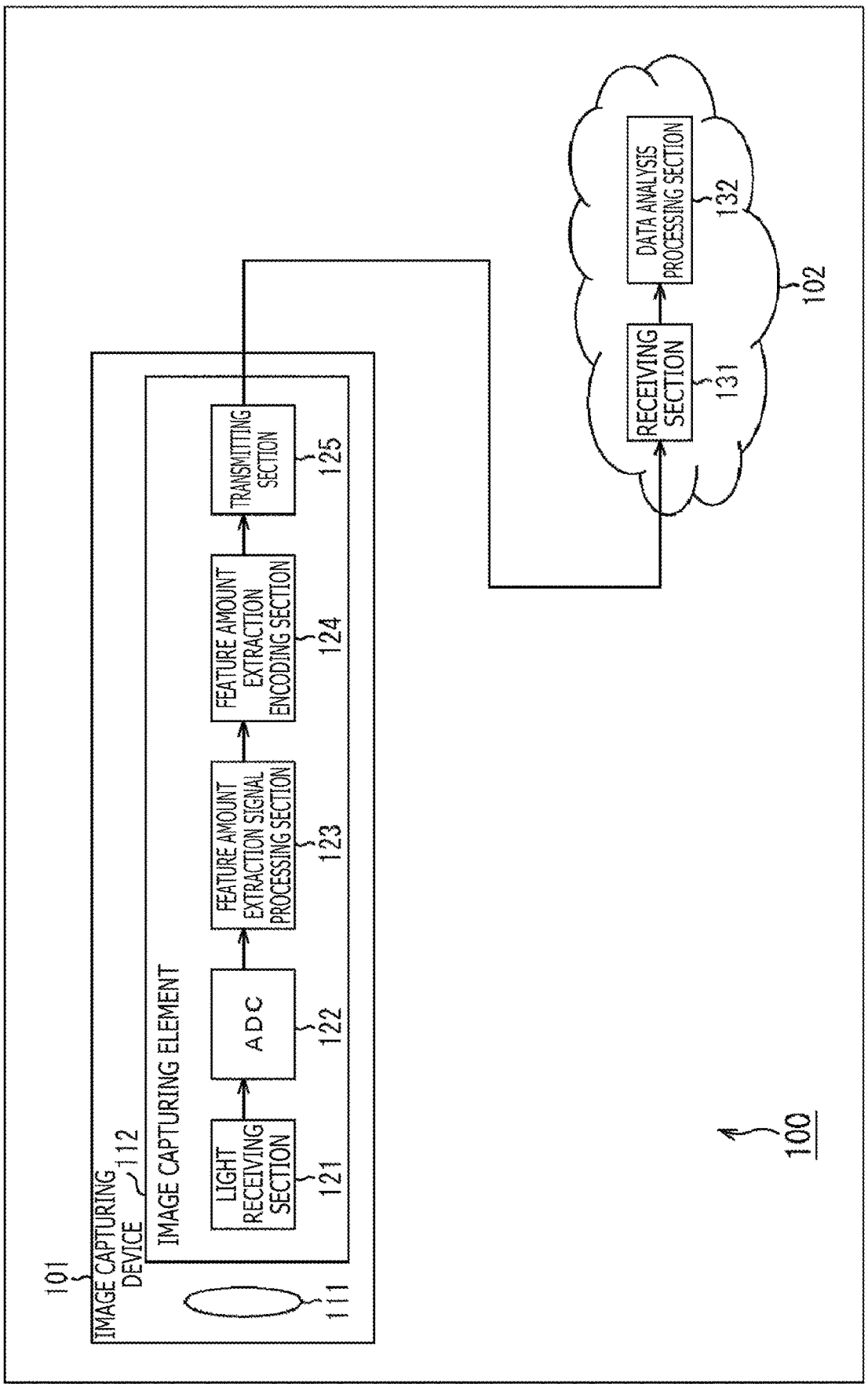

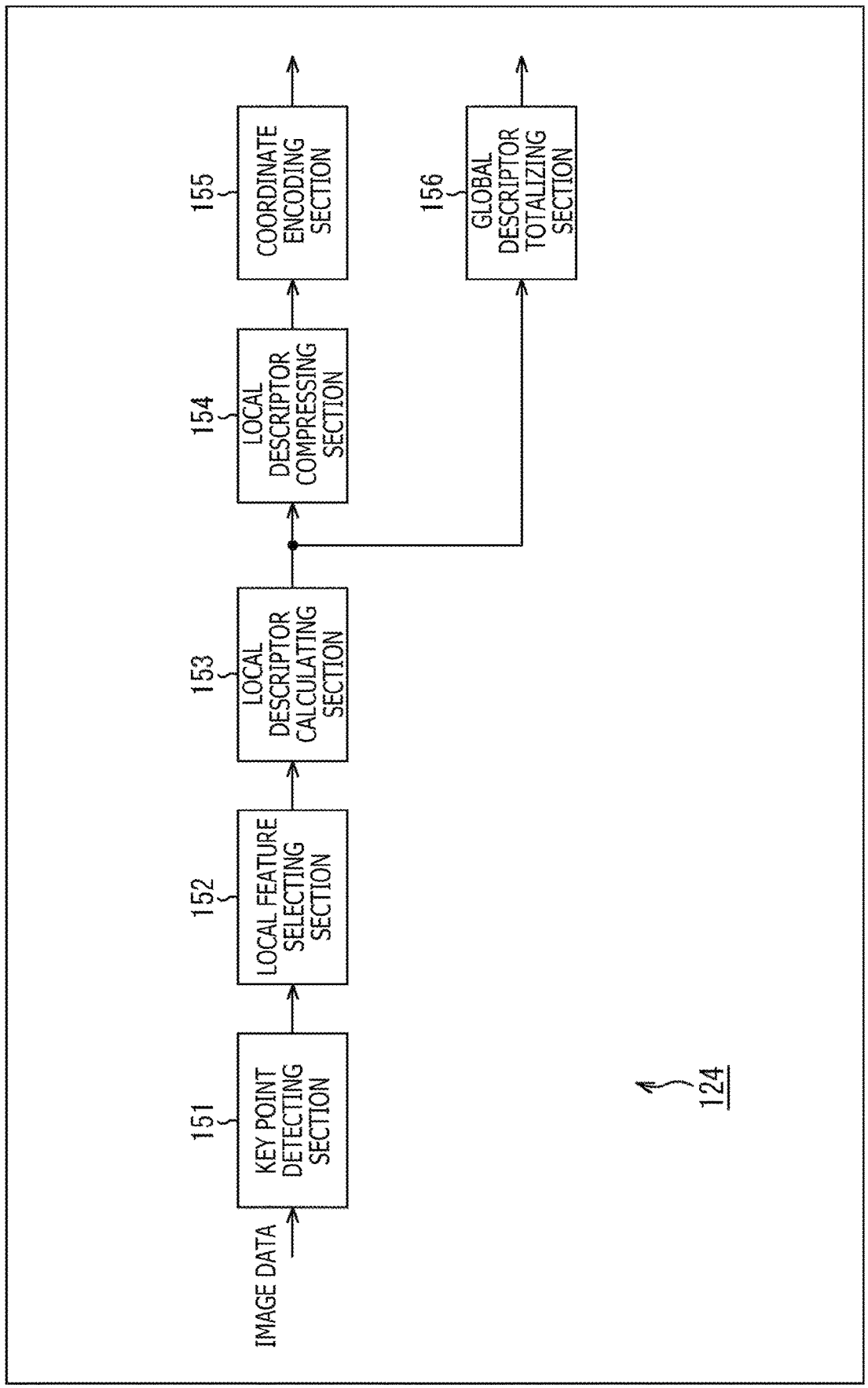

IMAGE CAPTURING ELEMENT, IMAGE CAPTURING DEVICE AND METHOD

CROSS REFERENCE TO RELATED APPLICATIONS

This application is a U.S. National Phase of International Patent Application No. PCT/JP2019/045557 filed on Nov. 21, 2019, which claims priority benefit of Japanese Patent Application No. JP 2018-228311 filed in the Japan Patent Office on Dec. 5, 2018. Each of the above-referenced applications is hereby incorporated herein by reference in its entirety.

TECHNICAL FIELD

The present disclosure relates to an image capturing element, an image capturing device and a method, and more particularly to an image capturing element, an image capturing device and a method capable of preventing a reduction in communication safety.

BACKGROUND ART

Conventionally, as a system for monitoring services in hospital rooms and homes, or the like, there has been a system for confirming the safety of a remote target. In the case of such a system, for example, a safety determination has been made by capturing an image of the target with an image sensor of a terminal device, transmitting the captured image to a cloud via a network, and extracting a feature amount from the captured image on the cloud side to analyze the feature amount.

However, in a case where the captured image is transmitted from the terminal device to a cloud in this way, there is a risk that personal information may be leaked due to leakage of the captured image to a third party.

Meanwhile, a method of extracting a feature amount from an image and transmitting the extracted feature amount to a cloud has been considered (see, for example, NPL 1).

CITATION LIST

Non Patent Literature

[NPL 1]
"Information technology—Multimedia content description interface—Part 13: Compact descriptors for visual search," ISO/IEC DIS 15938-13, Apr. 4, 2014, ISO/IEC JTC1/SC29/WG11

SUMMARY

Technical Problem

However, NPL 1 has not clarified generation of an image for extracting a feature amount. For example, in a case where a feature amount in a captured image obtained by an image capturing device is extracted by another device, there has been still a risk that personal information may be leaked in communication between the image capturing device and the other device.

The present disclosure has been made in view of such a situation, and is intended to be capable of preventing reduction in communication safety.

Solution to Problem

An image capturing element of one aspect of the present technology is an image capturing element including an image capturing section that captures an image of a subject to generate a captured image, and a feature amount extracting section that extracts a predetermined feature amount to be output to an outside from the captured image generated by the image capturing section.

An image capturing device of one aspect of the present technology is an image capturing device including an image capturing section that captures an image of a subject to generate a captured image, and a feature amount extracting section that extracts a predetermined feature amount to be output to an outside from the captured image generated by the image capturing section.

A method for capturing an image for one aspect of the present technology is a method for capturing an image, including generating a captured image by capturing an image of a subject, and extracting a predetermined feature amount to be output to an outside from the generated captured image.

In the image capturing element, image capturing device, and method of one aspect of the present technology, an image of a subject is captured, a captured image is generated, and a predetermined feature amount to be output to the outside is extracted from the generated captured image.

BRIEF DESCRIPTION OF DRAWINGS

FIG. 1 is a diagram illustrating a list of image capturing methods etc. to which the present technology is applied.

FIG. 2 is a block diagram illustrating a main configuration example of an image capturing device/image capturing element that implements method 1.

FIG. 3 is a block diagram illustrating a main configuration example of a feature amount extraction encoding section.

DESCRIPTION OF EMBODIMENTS

Figure 4:
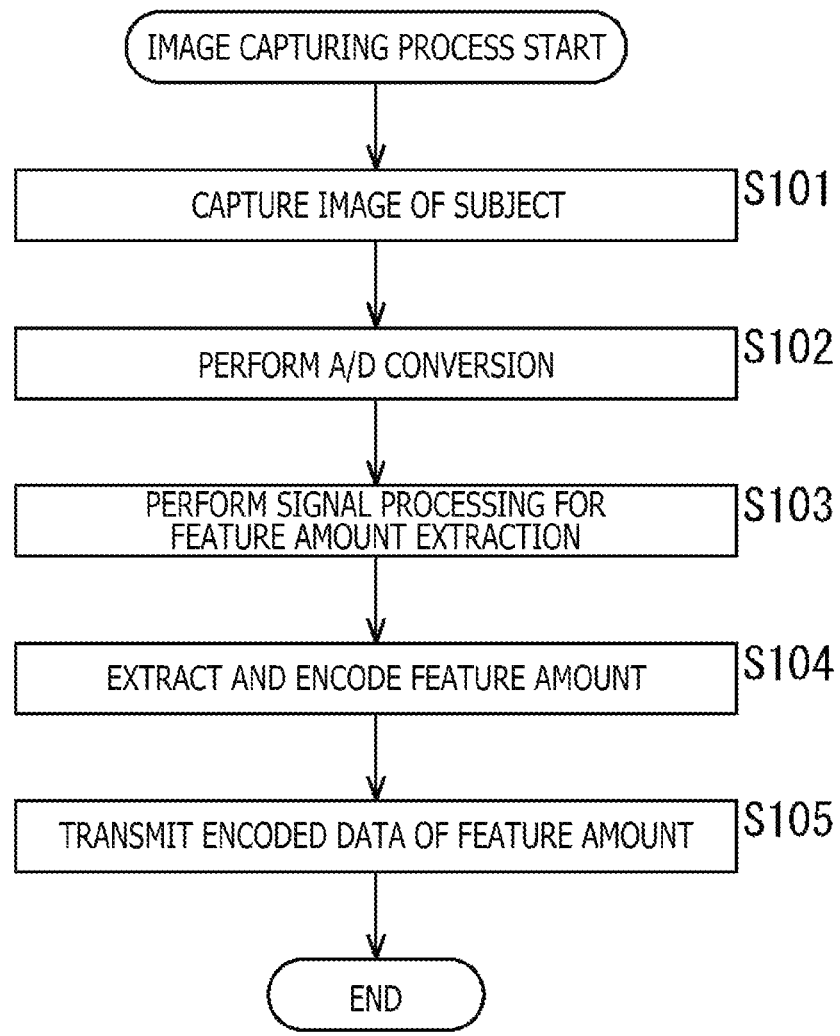
FIG. 4 is a flowchart illustrating an example of a flow of an image capturing process.

Hereinafter, modes for carrying out the present disclosure (hereinafter referred to as embodiments) will be described.

Note that the description will be given in the following order.
1. Communication Service with Image Recognition
2. Concept
3. First Embodiment (Details of Method 1)
4. Second Embodiment (Details of Method 1-1)
5. Third Embodiment (Details of Method 1-1-1)
6. Fourth Embodiment (Details of Method 1-1-1-1)
7. Fifth Embodiment (Details of Method 1-1-2)
8. Additional Statement 1. Communication Service with Image Recognition <Literature That Supports Technical Content and Technical Terms>

The scope disclosed in the present technology includes not only contents described in the embodiments but also contents described in the following literature known at the time of filing the application. In other words, the contents described in this literature are also grounds for determining support requirements.

Patent Literature 1: Described above

<Service with Image Recognition>

Conventionally, as a service accompanied by image recognition, for example, there has been a system for monitoring services in a hospital room or a home, or the like. In such a system, for example, a safety determination has been made on the basis of a result of image recognition by capturing an image of the target with an image sensor of a terminal device to transmit the captured image to a cloud via a network, extracting a feature amount from the captured image on the cloud side, and analyzing the feature amount to perform the image recognition.

Therefore, advanced image recognition can be achieved by using a cloud database etc., and more accurate safety determination can be carried out under more diverse situations. Therefore, by applying such a system, offering of more advanced services can be achieved.

However, in the case of this method, it is necessary to transmit the captured image from the terminal device to a cloud. This captured image may include personal information (information regarding privacy) such as the user's face and room situations, for example. Therefore, if the captured image is leaked to a third party during communication, personal information may also be leaked. In other words, there is a risk that the safety of communication may be reduced by transmitting the captured image by communication.

In contrast, a method can also be considered in which, by giving priority to personal information protection, the target is monitored by use of a sensor other than the image sensor such as a pyroelectric sensor, for example, and the safety is confirmed with the sensing result. However, in the case of the pyroelectric sensor, for example, a positional relation cannot be discriminated in detail, and it is difficult to detect a change in posture and to identify a person. As described above, in a case where a sensor other than the image sensor is used, there has been a risk that the image recognition performance is more reduced as compared with the case of using the image sensor and that the quality of the service provided on the basis of the image recognition result may be more reduced.

2. Concept

Accordingly, the image sensor extracts the feature amount from the captured image for encoding and outputs the encoded data of the feature amount (Method 1 in the table of FIG. 1). That is, an image of a subject is captured to generate a captured image, and a predetermined feature amount to be output to the outside is extracted from the generated captured image. For example, an image capturing element or an image capturing device is provided with an image capturing section that captures an image of a subject to generate a captured image, and a feature amount extracting section that extracts a predetermined feature amount to be output to the outside from the captured image generated by the image capturing section.

In such a manner described above, the image capturing element or the image capturing device can output the feature amount of the captured image without outputting the captured image. Therefore, it is possible to prevent the reduction in communication safety and to protect privacy. In addition, since the safety can be detected by image recognition, more accurate safety determination can be achieved under more diverse situations. Hence, it becomes possible to provide more enhanced services.

In addition, the captured image may be subjected to signal processing for extracting the feature amount. For example, an image capturing element/image capturing device may be further provided with a signal processing section that performs signal processing for extracting a feature amount on a captured image generated by the image capturing section, and the feature amount extracting section may extract the feature amount from the captured image subjected to signal processing by the signal processing section. By such signal processing, the extraction of the feature amount from the captured image can be made easier or more accurate. In addition, since the captured image is not output, the signal processing can be limited to processing regarding the feature amount extraction. For example, the image resolution, frame frequency, content of demosaicing and color conversion processing, and the like can be set to a level required for feature amount extraction. Therefore, an increase in load of signal processing can be prevented. That is, an increase in processing time of the signal processing and power consumption can be prevented.

In addition, the extracted feature amount may be encoded. For example, in the image capturing element/image capturing device, the feature amount extracting section may encode the extracted feature amount. In such a manner described above, an increase in amount of data of the information to be output can be prevented. In addition, by transmitting the encoded data, even in a case where the data is leaked to a third party, it is difficult for the third party to obtain the original feature amount, so that the reduction in communication safety can be prevented.

In addition, the image capturing element/image capturing device may be provided with a transmitting section that transmits the extracted feature amount (or encoded data thereof). That is, the transmitting section can be formed inside the image capturing element/image capturing device, or can be formed outside these (in another device).

In addition, a header may be generated and added. For example, an image capturing element/image capturing device may be provided with a header generating section that generates header information regarding a feature amount, and an adding section that adds the header information generated by the header generating section to the feature amount extracted by the feature amount extracting section. In such a manner described above, various pieces of information regarding the information to be transmitted (for example, the feature amount) can be stored in the header and transmitted in association with the feature amount. Hence, the cloud can provide, for example, more diverse services on the basis of the information included in the header.

In addition, in the image capturing element, the above-mentioned image capturing section and feature amount extracting section may be packaged and formed on different substrates, respectively. That is, the sections may be packaged and the feature amount extraction/encoding may be performed in a logic layer (Method 1-1 in the table of FIG. 1). In such a manner described above, the output of the captured image to the outside of the image capturing element can be prevented, so that the leakage of the captured image can be further prevented.

Note that, by separating the substrates of the image capturing section and the feature amount extracting section, these substrates can be stacked. That is, in the image capturing element, the substrate in which the image capturing section is formed and the substrate in which the feature amount extracting section is formed may be superimposed on top of another. In such a manner described above, the image capturing element can be further miniaturized. In addition, this can prevent an increase in the cost of the image capturing element.

In addition, a function of selecting an operation mode may be included (Method 1-1-1 in the table of FIG. 1). For example, the image capturing element or the image capturing device may be able to select whether to output the captured image or to output the feature amount. That is, the image capturing element or the image capturing device may be provided with a selecting section that performs the selection. In such a manner described above, it becomes possible to output not only the feature amount but also the captured image. Therefore, convenience can be improved.

It should be noted that the selection may be made on the basis of a request from the outside of the image capturing element. In such a manner described above, for example, it is possible to request from the cloud for determining whether to output an image or a feature amount, and offering of a wider variety of services can be achieved.

In addition, an authentication function for the request source may be included (Method 1-1-1-1 in the table of FIG. 1). For example, an image capturing element/image capturing device may be provided with an authenticating section that authenticates a request source of an external request, and in a case where the request source is authenticated by the authenticating section, the selecting section may select information to be output on the basis of the request. In such a manner described above, a request from a dishonest request source can be rejected. That is, requests can be accepted more safely from the outside.

Further, the image capturing element/image capturing device may be provided with an image signal processing section that performs predetermined signal processing on the captured image generated by the image capturing section, and an encoding section that encodes a captured image subjected to signal processing by the image signal processing section. In other words, signal processing or encoding may be performed on the captured image to be output. By performing signal processing in this way, a decrease in image quality can be prevented. Furthermore, by encoding, an increase in the amount of data of the information to be output can be prevented.

Note that, in the case of the image output mode, the image to be output may be generated by use of a part (partial region) of the pixel region (photoelectric conversion region). In other words, a captured image having a lower resolution than that of the captured image from which the feature amount is extracted may be output. For example, in the image capturing element/image capturing device, in a case where the output of the captured image is chosen by the selecting section, the image capturing section may generate the captured image by using a part of the photoelectric conversion region. In such a manner described above, an increase in the amount of data of the information to be output can be prevented. In addition, by lowering the resolution, the amount of leaked personal information in a case where the image is leaked to a third party can be reduced.

In addition, a function of limiting the region of the image to be output on the basis of the feature amount may be included (Method 1-1-2 in the table of FIG. 1). For example, in the image capturing element/image capturing device, the image capturing section may generate a captured image by using a part of the photoelectric conversion region within a range based on the feature amount extracted by the feature amount extracting section. In such a manner described above, a captured image in a region to be closely observed, which is specified by analyzing a feature amount, for example, can be output. Therefore, a captured image that is more important and prevents an increase in amount of unnecessary data can be output.

3. First Embodiment (Details of Method 1)

<Communication System>

FIG. 2 is a block diagram illustrating an example of a configuration of a communication system to which the present technology is applied. A communication system 100 illustrated in FIG. 2 is a system that has an image capturing device 101 and a cloud 102, which communicate with each other. The image capturing device 101 captures an image of a subject to generate a captured image, and extracts the feature amount of the captured image, and then provides the captured image to the cloud 102. The cloud 102 analyzes the feature amount supplied from the image capturing device 101 and provides a service based on the analysis result.

For example, the communication system 100 fulfills a monitoring service in a hospital room or a home by executing such processing. For example, the image capturing device 101 is installed in a room or the like of an observation target (monitoring target), and captures images of the observation target at that location periodically or triggered by a predetermined event. Then, the image capturing device 101 extracts a feature amount of the captured image and transmits the feature amount to the cloud 102. The cloud 102 receives the feature amount, and then analyzes the feature amount, thereby confirming the safety of the observation target, or the like. In addition, the cloud 102 provides a predetermined service (notification, for example) based on the confirmation result.

That is, the cloud 102 can confirm the safety on the basis of the captured image. Accordingly, the cloud 102 can carry out a more accurate safety determination under more diverse situations. Thus, it becomes possible to provide more enhanced services.

Further, since the image capturing device 101 transmits the feature amount to the cloud 102 instead of the captured image, even if a third party can illegally acquire the feature amount, only the feature amount as the data of the captured image can be simply obtained, and the captured image cannot be restored. Accordingly, by adopting such a mechanism, the communication system 100 can prevent the leakage of the information regarding the target to be observed.

In addition, in a case where the captured image is transmitted from the image capturing device 101 to the cloud 102, a complicated and expensive mechanism such as strong encryption is required in order to ensure sufficient communication safety and prevent leakage of personal information, so that there is a risk that the cost may increase. In contrast, this method only transmits the feature amount as described above and can be easily realized, thereby preventing the increase in cost.

In addition, the feature amount generally has a smaller amount of information than that of the captured image. Thus, by transmitting the feature amount as in the present method, the amount of information to be transmitted can be reduced as compared with a case of transmitting the captured image. As a result, an increase in communication load can be prevented. Therefore, an increase in cost of the communication system 100 (the image capturing device 101, the cloud 102, etc.) can be prevented.

As illustrated in FIG. 2, the image capturing device 101 includes an optical system 111 and an image capturing element 112. The optical system 111 includes, for example, a lens, a diaphragm, and the like, and has an optical effect on the light transmitted through the optical system 111. For example, the light from the subject enters the image capturing element 112 (light receiving section 121) via the optical system 111. The optical system 111 has an optical effect on this light.

The image capturing element 112 performs processing related to image capturing. As illustrated in FIG. 2, the image capturing element 112 includes a light receiving section 121, an ADC (Analog Digital Converter) 122, a feature amount extraction signal processing section 123, a feature amount extraction encoding section 124, and a transmitting section 125.

The light receiving section 121 receives light from a subject (for example, an observation target) and performs photoelectric conversion to generate a captured image as an electric signal. The light receiving section 121 supplies the electric signal of the captured image to the ADC 122. The ADC 122 acquires the electric signal of the captured image and performs A/D conversion of the signal to generate digital data of the captured image (also referred to as captured image data). The ADC 122 supplies the captured image data to the feature amount extraction signal processing section 123.

When acquiring the captured image data supplied from the ADC 122, the feature amount extraction signal processing section 123 performs signal processing related to the feature amount extraction on the image data. The feature amount extraction signal processing section 123 supplies the captured image data subjected to the signal processing to the feature amount extraction encoding section 124.

Note that, since the captured image is used for extracting the feature amount (since it is not used for ornamental purposes etc.), also the signal processing for the captured image by the feature amount extraction signal processing section 123 only needs to be one that is related to the feature amount extraction. For example, the process may be a process having a relatively light load, such as resolution conversion, frame frequency conversion, demosaicing, and color conversion processing. In this way, an increase in the load of signal processing can be prevented by using the captured image only for feature amount extraction without outputting the captured image. As a result, an increase in processing time and power consumption can be prevented. As a matter of course, the content of this signal processing is optional as long as the content is related to feature extraction.

In addition, it is sufficient if the captured image may have an enough amount of information for extracting the feature amount. Therefore, for example, the feature amount extraction signal processing section 123 can reduce the resolution and frame frequency of the captured image within the range in which the feature amount extraction can be performed with sufficient accuracy by this signal processing (that is, the amount of information regarding the captured image can be reduced while the feature amount extraction accuracy is not reduced). As a result, an increase in the processing time and power consumption for feature amount extraction can be prevented.

The feature amount extraction encoding section 124 acquires the captured image data supplied from the feature amount extraction signal processing section 123, and extracts a predetermined feature amount of the captured image. In addition, the feature amount extraction encoding section 124 encodes the extracted feature amount and generates encoded data. The feature amount to be extracted and the encoding method are optional. By encoding the feature amount in this way, the amount of information to be transmitted can be further reduced. Further, the feature amount extraction encoding section 124 supplies the generated encoded data to the transmitting section 125.

The transmitting section 125 acquires the encoded data supplied from the feature amount extraction encoding section 124 and transmits the data to the cloud 102 (receiving section 131) via an optional network (communication medium) such as the Internet.

The cloud 102 performs processing related to feature amount analysis. As illustrated in FIG. 2, the cloud 102 has a receiving section 131 and a data analysis processing section 132. The receiving section 131 receives the encoded data transmitted from the image capturing device 101 (image capturing element 112 (transmitting section 125)) and supplies the data to the data analysis processing section 132.

The data analysis processing section 132 acquires the encoded data supplied from the receiving section 131, and decodes the data, thereby restoring the feature amount data of the captured image. In addition, the data analysis processing section 132 analyzes the captured image by analyzing the restored feature amount, and confirms the safety of the observation target on the basis of the analysis result. Further, the data analysis processing section 132 may perform a predetermined service (for example, notification or the like) according to the safety confirmation result.

<Feature Amount Extraction Encoding Section>

FIG. 3 is a block diagram illustrating a main configuration example of the feature amount extraction encoding section 124. In the example of FIG. 3, the feature amount extraction encoding section 124 applies MPEG CDVS (Moving Picture Experts Group Compact Descriptors for Visual Search) described in NPL 1. This MPEG CDVS is an MPEG standardized technology (ISO/IEC 15938-13: 2015) that defines a method for extracting and compressing a feature amount from an input image. The feature amount extraction encoding section 124 calculates the key points, the local feature amount, and the total feature amount by a similar method to SIFT, and compresses these.

As illustrated in FIG. 3, the feature amount extraction encoding section 124 in this case includes a key point detecting section 151, a local feature selecting section 152, a local descriptor calculating section 153, a local descriptor compressing section 154, and a coordinate encoding section 155, and a global descriptor totalizing section 156. The key point detecting section 151 detects a key point from the input image data. The local feature selecting section 152 derives a local feature amount from the image data. The local descriptor calculating section 153 calculates the local descriptor. The local descriptor compressing section 154 compresses the local descriptor. The coordinate encoding section 155 encodes the coordinates. The global descriptor totalizing section 156 totalizes the global descriptor.

<Flow of Image Capturing Process>

An example of the flow of the image capturing process executed by the image capturing device 101 will be described with reference to the flowchart in FIG. 4.

When the image capturing process is started, the light receiving section 121 captures an image of a subject in step S101 and generates an electric signal of the captured image. In step S102, the ADC 122 performs A/D conversion of the electrical signal of the captured image obtained in step S101 to generate captured image data.

In step S103, the feature amount extraction signal processing section 123 performs signal processing for feature amount extraction on the captured image data generated in step S102.

In step S104, the feature amount extraction encoding section 124 extracts the feature amount of the captured image from the captured image data appropriately subjected to the signal processing in step S103, and generates the encoded data of the feature amount by encoding the feature amount.

In step S105, the transmitting section 125 transmits the encoded data generated in step S104 (to the cloud 102).

When the process of step S105 is completed, the image capturing process ends.

By performing the image capturing process as described above, the image capturing device 101 can more safely provide information to the cloud 102. That is, the reduction in communication safety can be prevented.

4. Second Embodiment (Details of Method 1-1)

<Image Capturing Element>

The image capturing element 112 described with reference to FIG. 2 may be configured as a plurality of devices by dividing the processing sections of the light receiving section 121 to the transmitting section 125 into a plurality of parts, or the processing sections of the light receiving section 121 to the transmitting section 125 may be packaged into one and configured as a single device. By packaging the configuration of the image capturing element 112, leakage of the captured image can be further prevented. That is, stronger privacy protection can be achieved.

Figure 5:
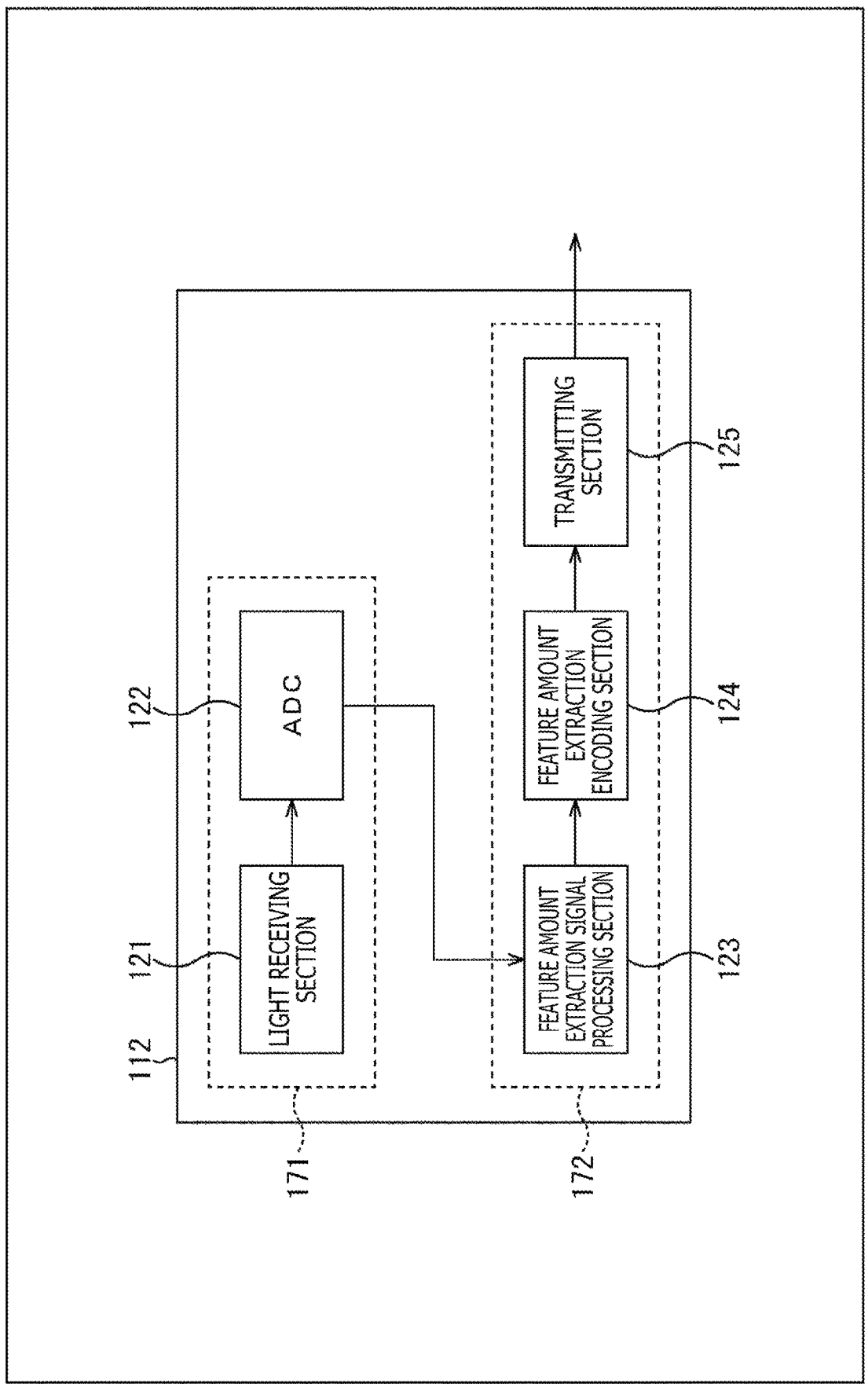
FIG. 5 is a block diagram illustrating a main configuration example of an image capturing element that implements Method 1-1.

FIG. 5 is a block diagram illustrating a main configuration example of the image capturing element 112 in a case where the processing sections of the light receiving section 121 to the transmitting section 125 are packaged into one. In this case, the packaged image capturing element 112 has a plurality of semiconductor substrates (semiconductor substrate 171 and semiconductor substrate 172). The light receiving section 121 and the ADC 122 are formed in the semiconductor substrate 171 in the package, and the feature amount extraction signal processing section 123, feature amount extraction encoding section 124, and transmitting section 125 are formed in the semiconductor substrate 172 in the package. In other words, the light receiving section 121 and the feature amount extraction encoding section 124 are formed in different semiconductor substrates, respectively.

Figure 6:
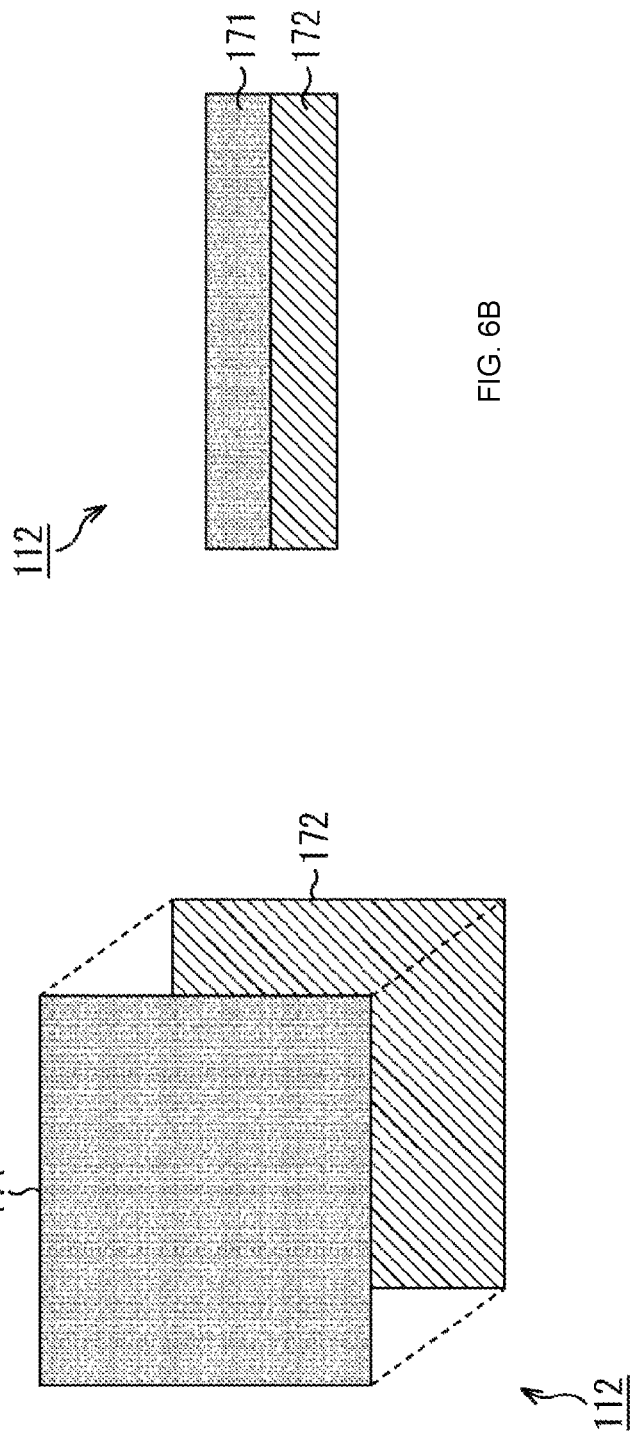
FIGS. 6A and 6B depict diagrams illustrating configurations of semiconductor substrates.

The semiconductor substrate 171 and the semiconductor substrate 172 may be arranged side by side on a plane, but the substrates may be superposed on each other as in the example in FIG. 6A to form a stacked structure as illustrated in FIG. 6B. With such a structure, an area of the packaged image capturing element 112 can be reduced, and miniaturization is possible. As a result, an increase in circuit scale can be prevented, and an increase in cost can be prevented.

<Image Capturing Device>

Figure 7:
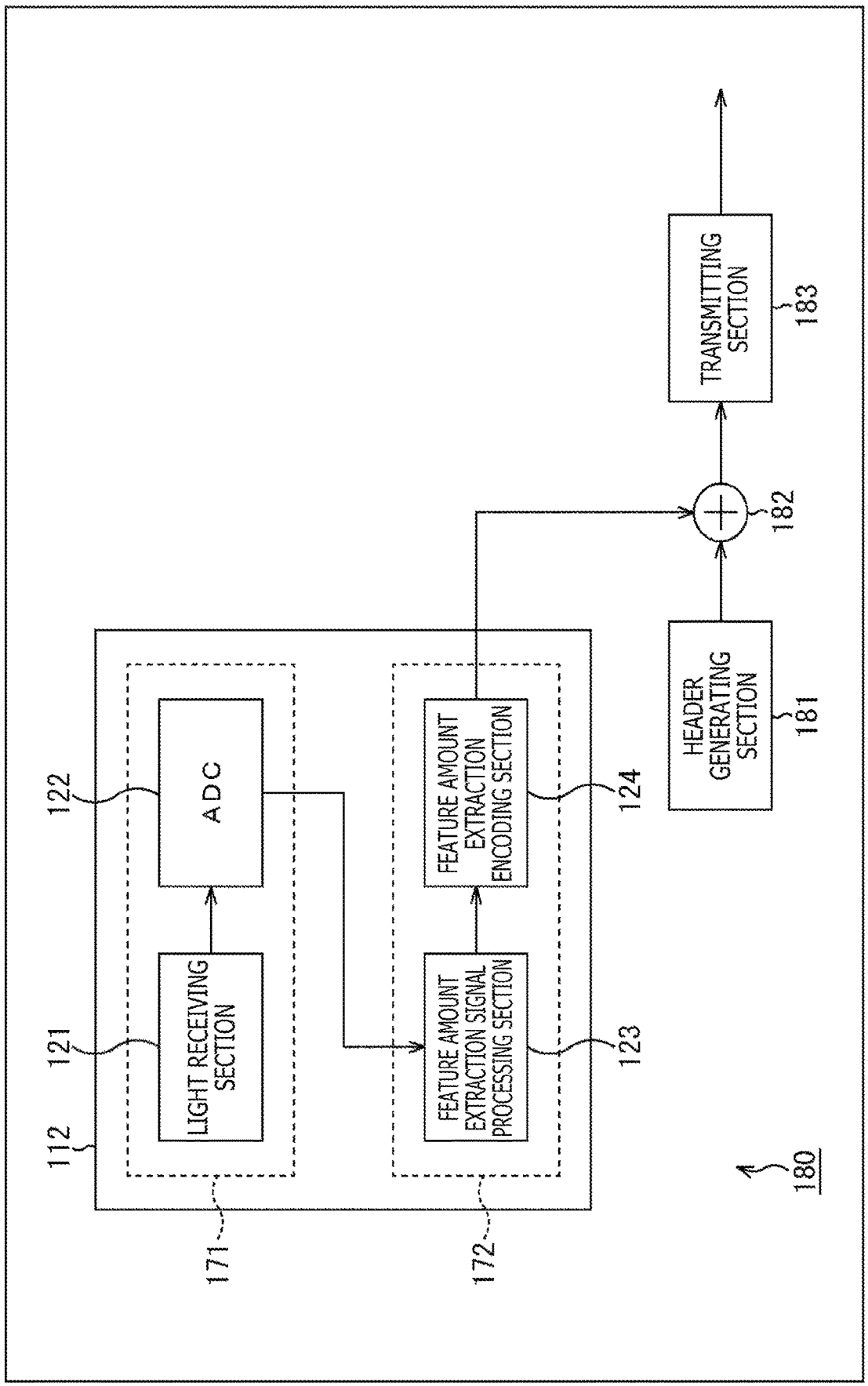
FIG. 7 is a block diagram illustrating a main configuration example of an image capturing device/image capturing element that implements Method 1-1.

Note that the transmitting section may be provided outside the packaged image capturing element 112 (provided on another chip). For example, an image capturing device 180 illustrated in FIG. 7 is a similar device to the image capturing device 101 (FIG. 2). However, the image capturing device 180 includes the packaged image capturing element 112, a header generating section 181 and an adding section 182, and a transmitting section 183.

The packaged image capturing element 112 in this case basically has a similar configuration to the example illustrated in FIG. 5, but differs from the example of FIG. 5 in that the image capturing element 112 does not include the transmitting section 125. In other words, the light receiving section 121 and the ADC 122 are formed in the semiconductor substrate 171, and the feature amount extraction signal processing section 123 and the feature amount extraction encoding section 124 are formed in the semiconductor substrate 172. Therefore, encoded data of the feature amount is output from the packaged image capturing element 112.

The header generating section 181 generates header information including information regarding the encoded data output from the packaged image capturing element 112 (namely, information regarding the feature amount of the captured image), and supplies the header information to the adding section 182. The adding section 182 adds the header information supplied from the header generating section 181 to the encoded data output from the packaged image capturing element 112 (feature amount extraction encoding section 124). The adding section 182 supplies the encoded data to which the header information is added to the transmitting section 183.

The transmitting section 183 is a processing section similar to the transmitting section 125, and acquires the encoded data to which the header information is added and which is supplied from the adding section 182, thereby transmitting the data (to the cloud 102).

In other words, the image capturing device 180 generates header information, combines the header information with the encoded data of the feature amount, and transmits the encoded data to which the header information is added, outside the packaged image capturing element 112. In such a manner described above, an increase in the hardware scale and power consumption as a whole can be prevented.

<Flow of Image Capturing Process>

Figure 8:
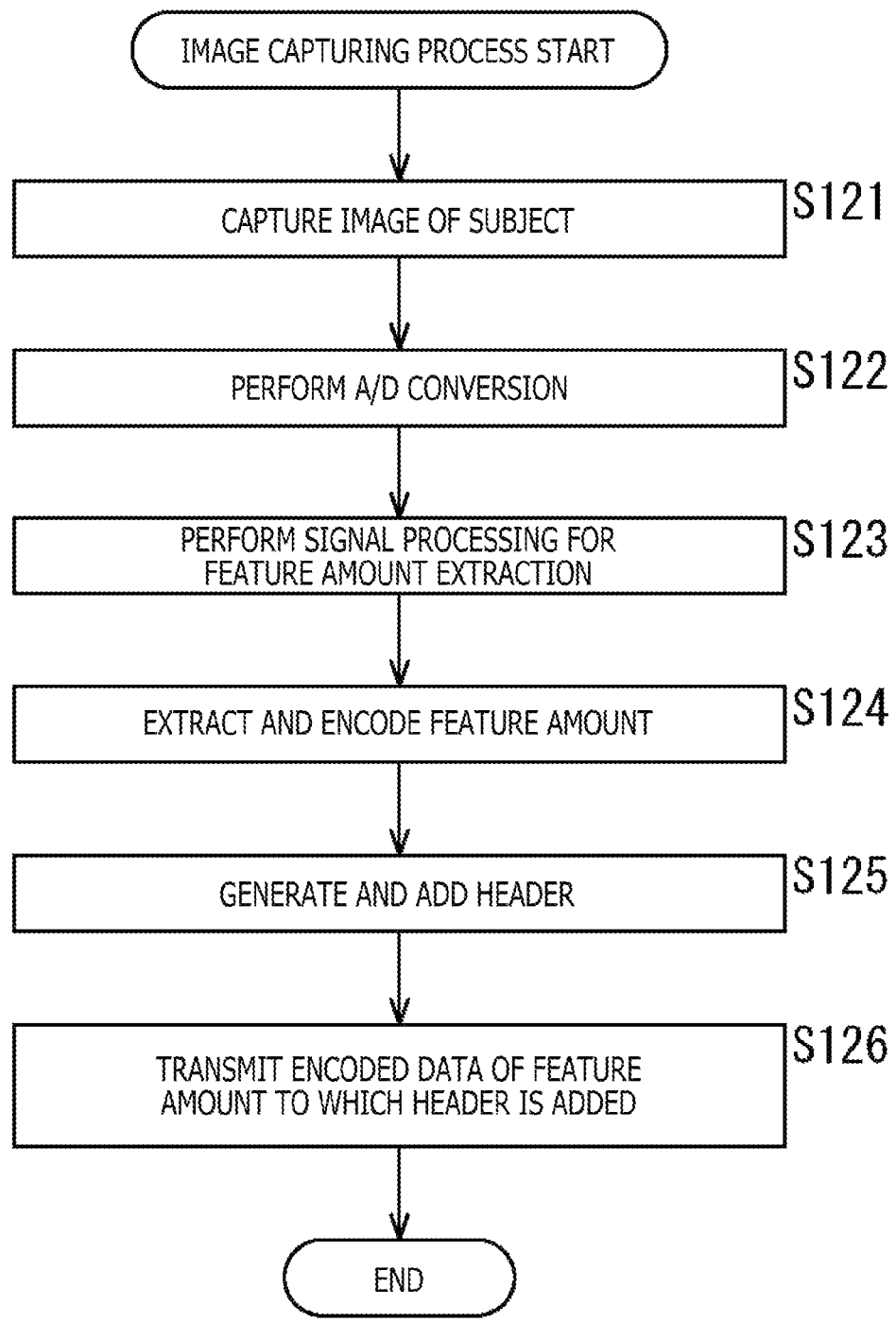
FIG. 8 is a flowchart illustrating an example of a flow of the image capturing process.

An example of the flow of the image capturing process in this case will be described with reference to the flowchart in FIG. 8. When the image capturing process is started, each processing of steps S121 to S124 is executed in a similar manner to each process of steps S101 to S104 (FIG. 4).

In step S125, the header generating section 181 generates the header information, and the adding section 182 adds the header information to the encoded data of the feature amount.

In step S126, the transmitting section 183 transmits the encoded data of the feature amount to which the header is added in step S125. When the process of step S126 is completed, the image capturing process ends.

By performing the image capturing process as described above, the image capturing device 180 can more safely provide information to the cloud 102. That is, the reduction in communication safety can be prevented.

5. Third Embodiment (Details of Method 1-1-1)

<Communication System>

The image capturing element or the image capturing device may have a function of selecting an operation mode. For example, the image capturing element or the image capturing device may be able to select whether to output the captured image or to output the feature amount.

Figure 9:
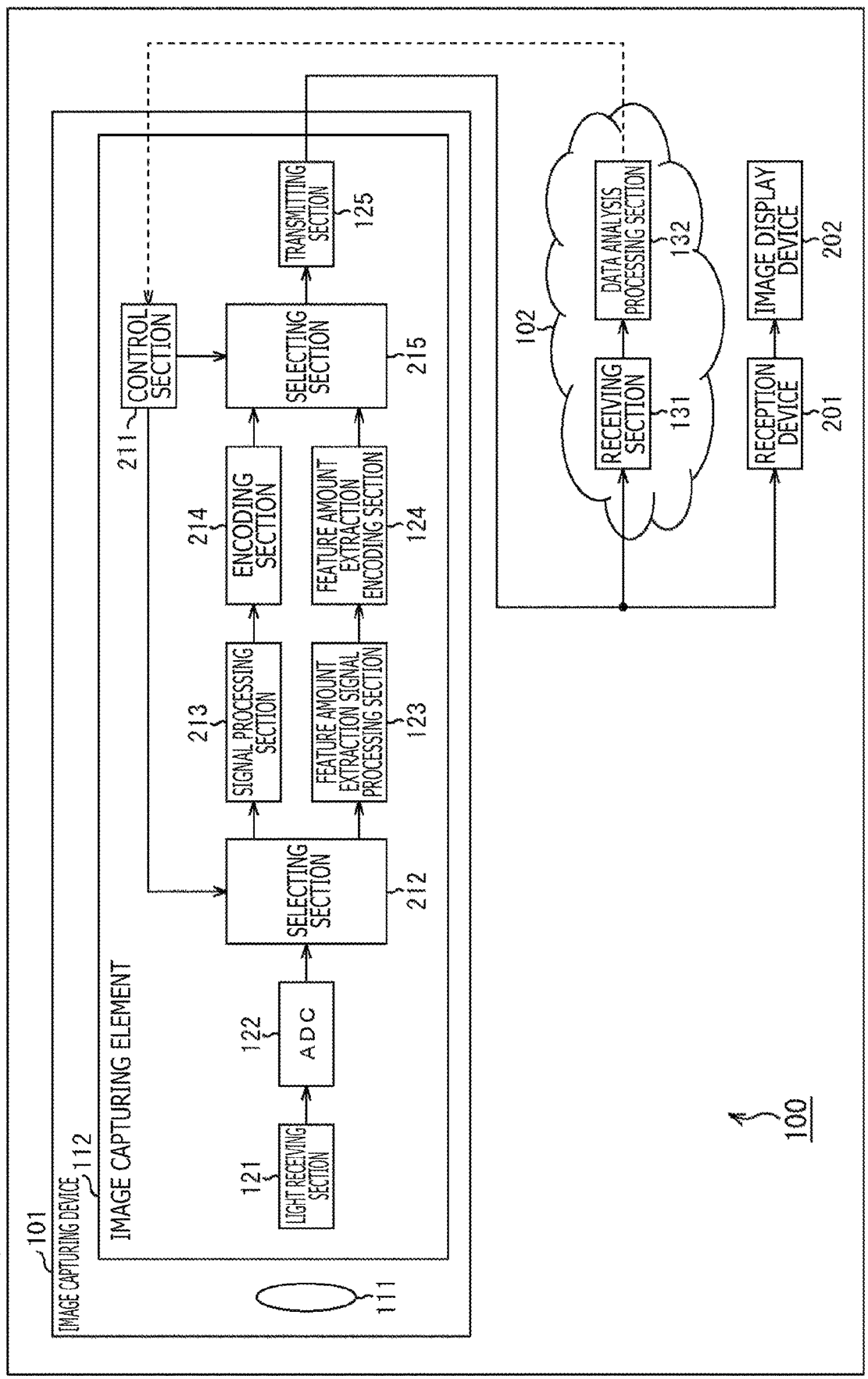
FIG. 9 is a block diagram illustrating a main configuration example of an image capturing device/image capturing element that implements Method 1-1-1.

FIG. 9 is a block diagram illustrating a main configuration example of the communication system 100 in that case. As illustrated in FIG. 9, in this case, the image capturing element 112 includes a control section 211, a selecting section 212, a signal processing section 213, an encoding section 214, and a selecting section 215 in addition to the configuration illustrated in FIG. 2.

The control section 211 receives a request regarding the operation mode from the outside of the image capturing device 101, and controls the operation mode on the basis of the request. To be more specific, the control section 211 controls the selecting section 212 and the selecting section 215 to select (switch) the operation mode.

The image capturing element 112 in this case is provided with a mode of outputting the feature amount (encoded data thereof) and a mode of outputting the captured image (encoded data thereof) as operation modes. The control section 211 can select either mode by controlling the selecting section 212 and the selecting section 215.

Incidentally, the request source of the request regarding the operation mode is freely selected. For example, the request source may be a user of the image capturing device 101, or may be the cloud 102 (for example, the data analysis processing section 132) as illustrated in FIG. 9. In the case of the example of FIG. 9, the data analysis processing section 132 may make a request regarding the operation mode on the basis of the analysis result of the feature amount (safety confirmation result). For example, in a case where an abnormality is confirmed in the observation target in the safety confirmation, the data analysis processing section 132 may request the image capturing device 101 (image capturing element 112) to operate in the mode of outputting the captured image (encoded data thereof) for confirmation. In such a manner described above, the cloud 102 can carry out not only a mere safety confirmation but also an enhanced service such as notifying by using a captured image in a case where an abnormality occurs.

The selecting section 212 controls the connection destination of the ADC 122 according to the control of the control section 211. For example, when the selecting section 212 connects the ADC 122 to the signal processing section 213, the ADC 122 supplies the captured image data to the signal processing section 213 via the selecting section 212. That is, the image capturing element 112 operates in a mode in which the captured image (encoded data thereof) is output. In addition, when the selecting section 212 connects the ADC 122 to the feature amount extraction signal processing section 123, the ADC 122 supplies the captured image data to the feature amount extraction signal processing section 123 via the selecting section 212. That is, the image capturing element 112 operates in a mode in which the feature amount (encoded data thereof) is output.

The signal processing section 213 acquires the captured image data supplied via the selecting section 212, and performs predetermined signal processing on the captured image data. The content of this signal processing is optional. The signal processing section 213 can perform signal processing independently of the feature amount extraction signal processing section 123. For example, the signal processing section 213 performs signal processing for higher image quality than the signal processing of the feature amount extraction signal processing section 123, so that the image capturing device 101 can output a captured image (encoded data thereof) having a higher quality. The captured image data appropriately subjected to signal processing is supplied to the encoding section 214. The encoding section 214 encodes the captured image data supplied from the signal processing section 213 and appropriately subjected to signal processing, and generates the encoded data of the captured image. Incidentally, the encoding method is optional. The encoding section 214 supplies the generated encoded data to the selecting section 215.

Note that the encoding of the captured image may be omitted. In other words, the encoding section 214 may be omitted. That is, uncoded captured image data (captured image data appropriately subjected to predetermined signal processing by the signal processing section 213) may be supplied from the signal processing section 213 to the transmitting section 125 via the selecting section 215 to be transmitted.

The selecting section 215 controls the connection source of the transmitting section 125 according to the control of the control section 211. For example, when the selecting section 215 connects the encoding section 214 to the transmitting section 125, the encoding section 214 supplies the encoded data of the captured image to the transmitting section 125 via the selecting section 215. That is, the image capturing element 112 operates in a mode in which the captured image (encoded data thereof) is output. In addition, when the selecting section 215 connects the feature amount extraction encoding section 124 to the transmitting section 125, the feature amount extraction encoding section 124 transmits the encoded data of the feature amount to the transmitting section 125 via the selecting section 215. In other words, the image capturing element 112 operates in a mode in which the feature amount (encoded data thereof) is output.

In such a manner described above, the image capturing device 101 can output not only the feature amount but also the captured image. Accordingly, convenience can be improved.

<Flow of Image Capturing Process>

An example of the flow of the image capturing process in this case will be described with reference to the flowchart of FIG. 10. When the image capturing process is started, the control section 211 receives a request regarding the operation mode in step S201.

In step S202, the control section 211 sets the operation mode of the image capturing element 112 to the mode corresponding to the request received in step S201 (namely, the requested mode).

In step S203, the selecting section 212 and the selecting section 215 determine whether or not to output the captured image according to the control of the control section 211 in step S202. In a case where it is determined that the mode of outputting the feature amount is chosen, the selecting section 212 connects the ADC 122 to the feature amount extraction signal processing section 123, and the selecting section 215 connects the feature amount extraction encoding section 124 to the transmitting section 125, and then the process proceeds to step S204.

In step S204, the light receiving section 121 captures an image of the subject and generates an electric signal of the captured image. In step S205, the ADC 122 performs A/D conversion of the electrical signal of the captured image obtained in step S204 to generate captured image data. In step S206, the feature amount extraction signal processing section 123 performs signal processing for feature amount extraction on the captured image data generated in step S205. In step S207, the feature amount extraction encoding section 124 extracts the feature amount of the captured image from the captured image data appropriately subjected to the signal processing in step S206 and encodes the feature amount to generate the encoded data of the feature amount. In step S208, the transmitting section 125 transmits the encoded data generated in step S207 (to the cloud 102). When the process of step S208 is completed, the image capturing process ends.

In addition, in a case where it is determined in step S203 that the mode of outputting the captured image is chosen, the selecting section 212 connects the ADC 122 to the signal processing section 213, and the selecting section 215 connects the encoding section 214 to the transmitting section 125, and then, the process proceeds to step S209.

In step S209, the light receiving section 121 captures an image of the subject and generates an electric signal of the captured image. In step S210, the ADC 122 performs A/D conversion of the electrical signal of the captured image obtained in step S209 to generate captured image data. In step S211, the signal processing section 213 performs predetermined signal processing on the captured image data generated in step S210. In step S212, the encoding section 214 encodes the captured image data appropriately subjected to signal processing in step S211 to generate the encoded data of the captured image. In step S213, the transmitting section 125 transmits the encoded data of the captured image generated in step S212 (to the cloud 102). When the process of step S213 is completed, the image capturing process ends.

By performing the image capturing process as described above, the image capturing device 101 can provide not only the feature amount but also the captured image to the cloud 102. Thus, convenience can be improved.

6. Fourth Embodiment (Details of Method 1-1-1-1)

<Communication System>

In addition, the operation mode may be switched after the above-mentioned request (the request source) is authenticated and confirmed to be a legitimate request.

Figure 11:
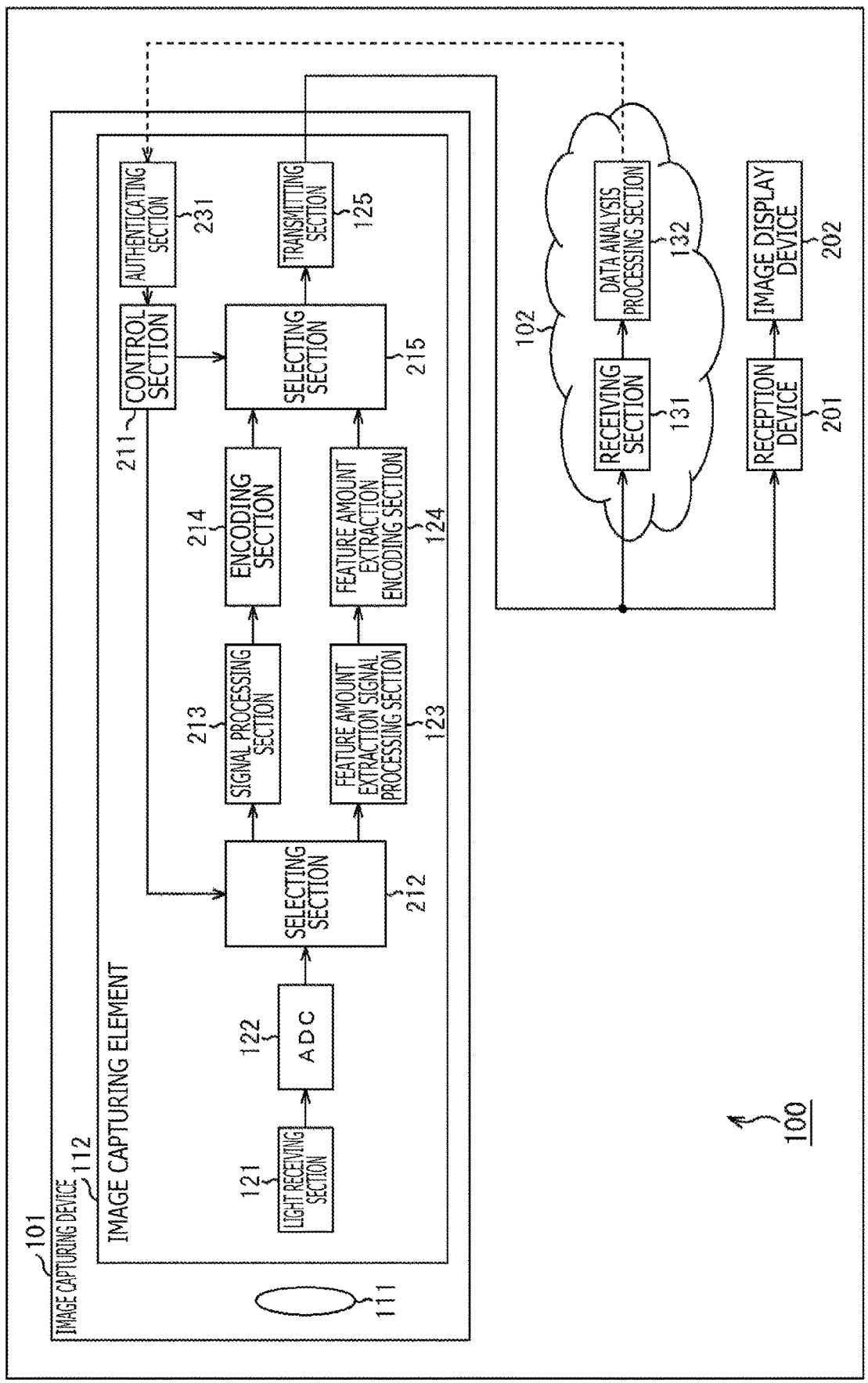
FIG. 11 is a block diagram illustrating a main configuration example of an image capturing device/image capturing element that implements Method 1-1-1-1.

FIG. 11 is a block diagram illustrating a main configuration example of the communication system 100 in that case. As illustrated in FIG. 11, in this case, the image capturing element 112 has an authenticating section 231 in addition to the configuration illustrated in FIG. 9.

The authenticating section 231 authenticates the request source regarding the request from the outside of the image capturing device 101. The authentication method is optional. When it is confirmed that the request source is a legitimate request source (in other words, a legitimate request), the authenticating section 231 supplies the request to the control section 211. The control section 211 performs processing in a similar manner to in the case of FIG. 9.

In such a manner described above, a request from a dishonest requester can be rejected. That is, the image capturing device 101 can more safely accept the request from the outside. Thus, the image capturing device 101 can output the captured image more safely.

Incidentally, the timing of performing the above authentication process is optional. For example, the process may be performed every time the operation mode is switched (that is, every time there is a request to change the operation mode), or only when the operation mode is switched for the first time (for example, only at login time). In addition, the authentication process for the request source may be performed only in the case of switching the operation mode to the mode of outputting the captured image (when there is such a request).

<Flow of Image Capturing Process>

An example of the flow of the image capturing process in this case will be described with reference to the flowchart of FIG. 12. When the image capturing process is started, the authenticating section 231 performs the authentication process for the request source in step S231. When it is confirmed that the request source is a legitimate request source, the process proceeds to step S232.

Figure 10:
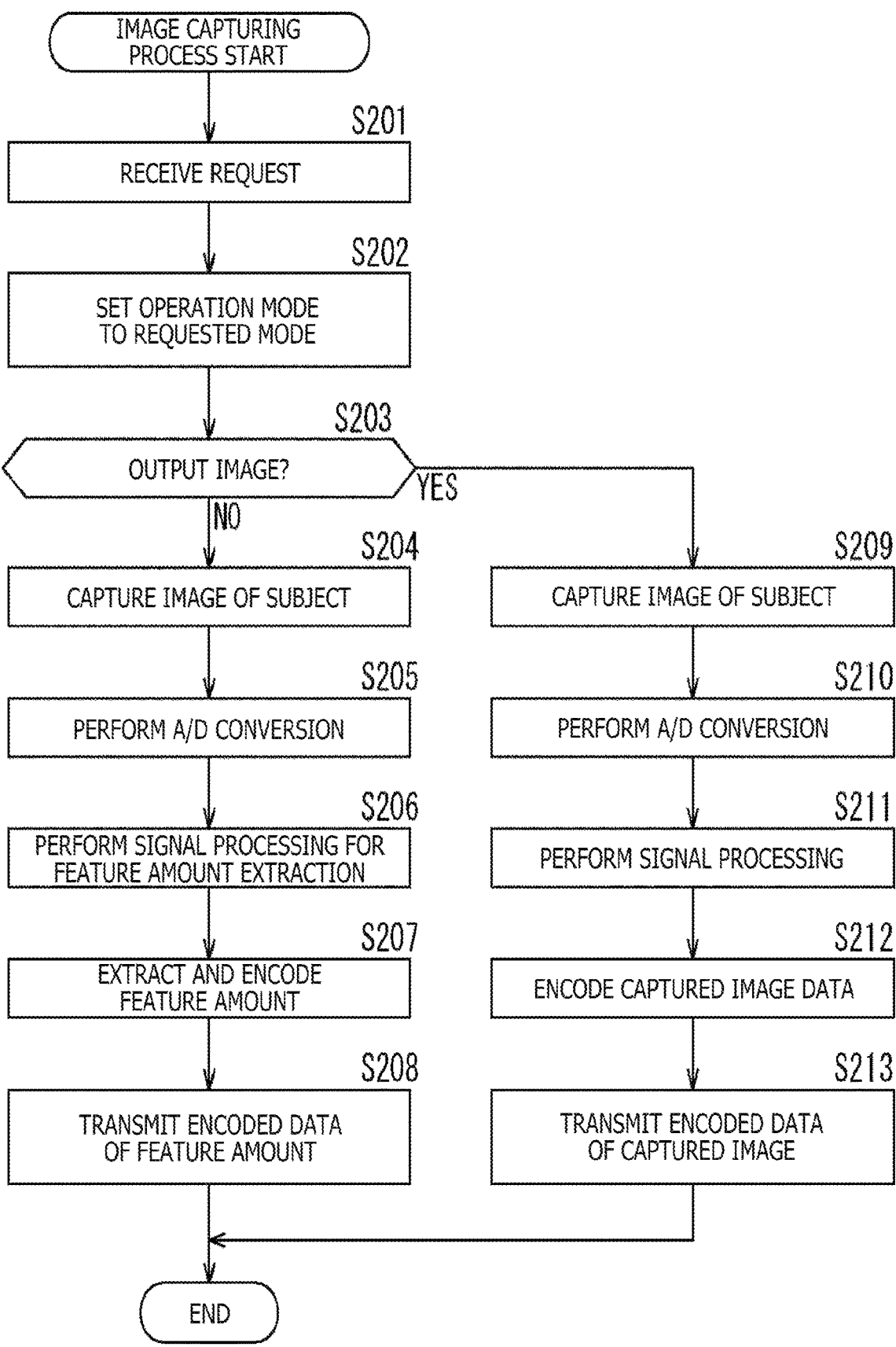
FIG. 10 is a flowchart illustrating an example of the flow of the image capturing process.

Each process of steps S232 to S244 is executed in a similar manner to each process of steps S201 to S213 (FIG. 10). Then, when the process of step S239 or step S244 is completed, the image capturing process ends.

By performing the image capturing process as described above, the image capturing device 101 can more safely accept the request from the outside and output the captured image more safely.

7. Fifth Embodiment (Details of Method 1-1-2)

<Communication System>

In addition, in a case where the image capturing device 101 outputs the captured image, the image may be generated by using a part (partial region) of the pixel region (photoelectric conversion region). That is, the angle of view may be limited, and a captured image having a lower resolution than the captured image from which the feature amount is extracted may be output. In such a manner described above, the data amount of captured image data can be reduced, so that an increase in the processing load in the image capturing element 112 can be prevented. Further, an increase in the output data rate when the data is output from the image capturing element 112 can be prevented. Therefore, an increase in the cost of the image capturing element 112 can be prevented. Similarly, an increase in the load of the processing of the cloud 102 and the processing on the image display side can also be prevented.

It should be noted that such limitation of the pixel region (limitation of the angle of view) may be set on the basis of the feature amount extracted from the captured image. That is, the image capturing section may generate the captured image by using a part of the photoelectric conversion region within the range based on the feature amount extracted by the feature amount extracting section. For example, on the basis of the image analysis of the captured image performed by analyzing the feature amount, the place where the abnormality occurs (partial region), the place where the observation target exists (partial region), or the like in the captured image can be specified as a region to be closely observed. By outputting the captured image of such region to be closely observed (the captured image obtained by deleting the other regions), the image capturing device 101 can output the captured image worthier of viewing. In other words, by not including other partial regions that are less valuable to be observed in the captured image, an unnecessary increase in the amount of data in the captured image can be prevented (typically, the data amount in the captured image can be reduced).

In addition, such a method of limiting the pixel region is optional. For example, a captured image may be generated once without limiting the angle of view, and a region to be closely observed may be cut out from the captured image by image processing. In addition, for example, the light receiving section 121 and the ADC 122 may be controlled to drive only the pixel region and the A/D converters corresponding to the region to be closely observed to generate a captured image of the region to be closely observed. By driving only the necessary parts as in the latter case, an increase in the image capturing load can be prevented.

Figure 13:
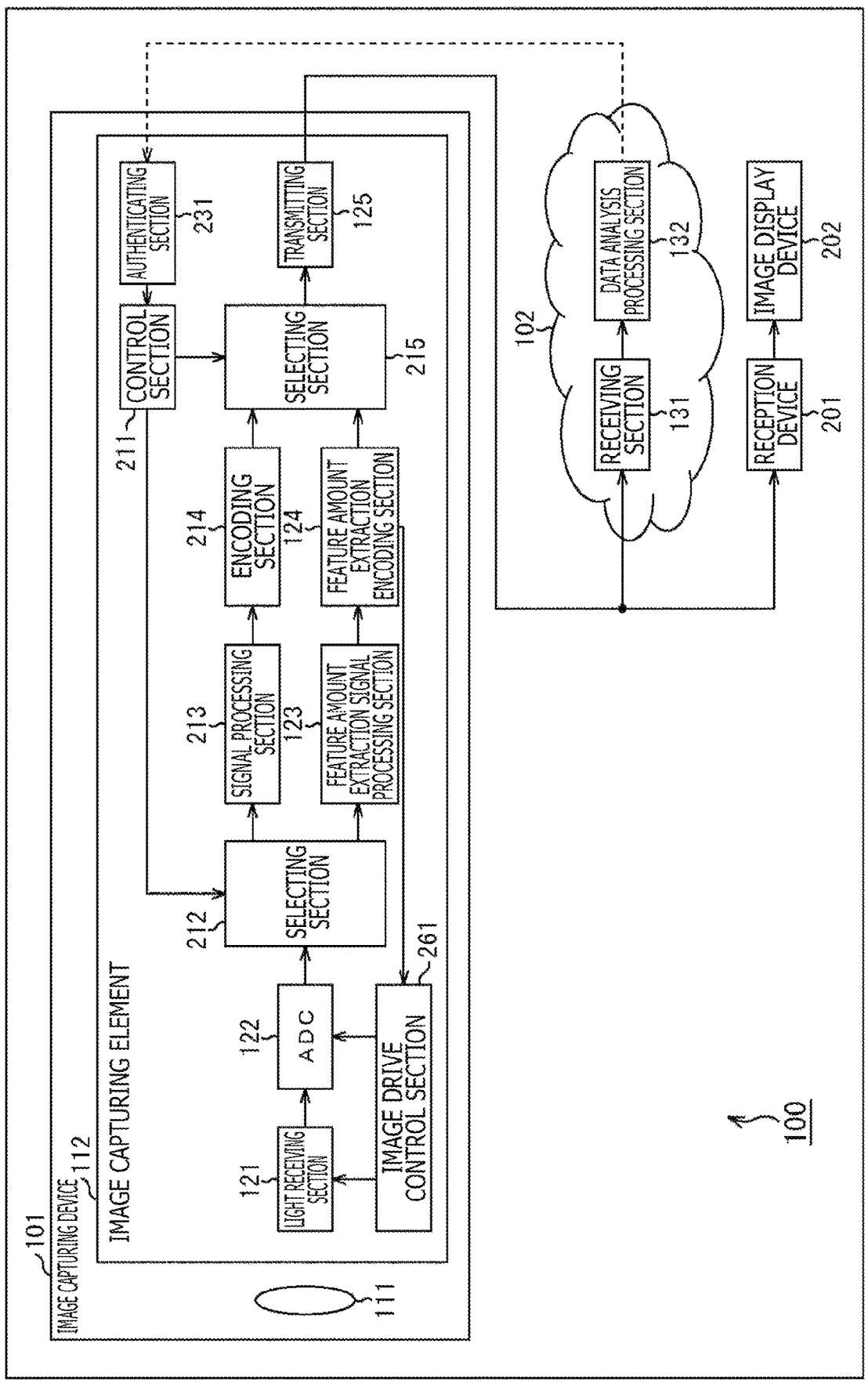
FIG. 13 is a block diagram illustrating a main configuration example of an image capturing device/image capturing element that implements Method 1-1-2.

FIG. 13 is a block diagram illustrating a main configuration example of the communication system 100 in that case. As illustrated in FIG. 13, in this case, the communication system 100 has a reception device 201 and an image display device 202 in addition to the image capturing device 101 and the cloud 102. The reception device 201 receives the encoded data of the captured image transmitted from the image capturing device 101, and supplies the received encoded data to the image display device 202. The image display device 202 acquires the encoded data supplied from the reception device 201, decodes the data to generate captured image data, and displays the captured image.

In addition, the image capturing element 112 has an image drive control section 261 in addition to the configuration illustrated in FIG. 11. The image drive control section 261 acquires the feature amount of the captured image extracted by the feature amount extraction encoding section 124, and controls the light receiving section 121 and the ADC 122 on the basis of the feature amount. To be more specific, the image drive control section 261 controls the light receiving section 121 and the ADC 122 to drive a part necessary for generating a captured image in the region to be closely observed which is derived by the acquired feature amount.

The light receiving section 121 drives only a part of the pixel region designated by the image drive control section 261 to generate a captured image. In addition, the ADC 122 drives only the necessary A/D converters according to the control of the image drive control section 261 to generate the captured image data of the region to be closely observed. In such a manner described above, it is possible to prevent the driving of unnecessary parts and to prevent the increase in load.

<Flow of Image Capturing Process>

Figure 14:
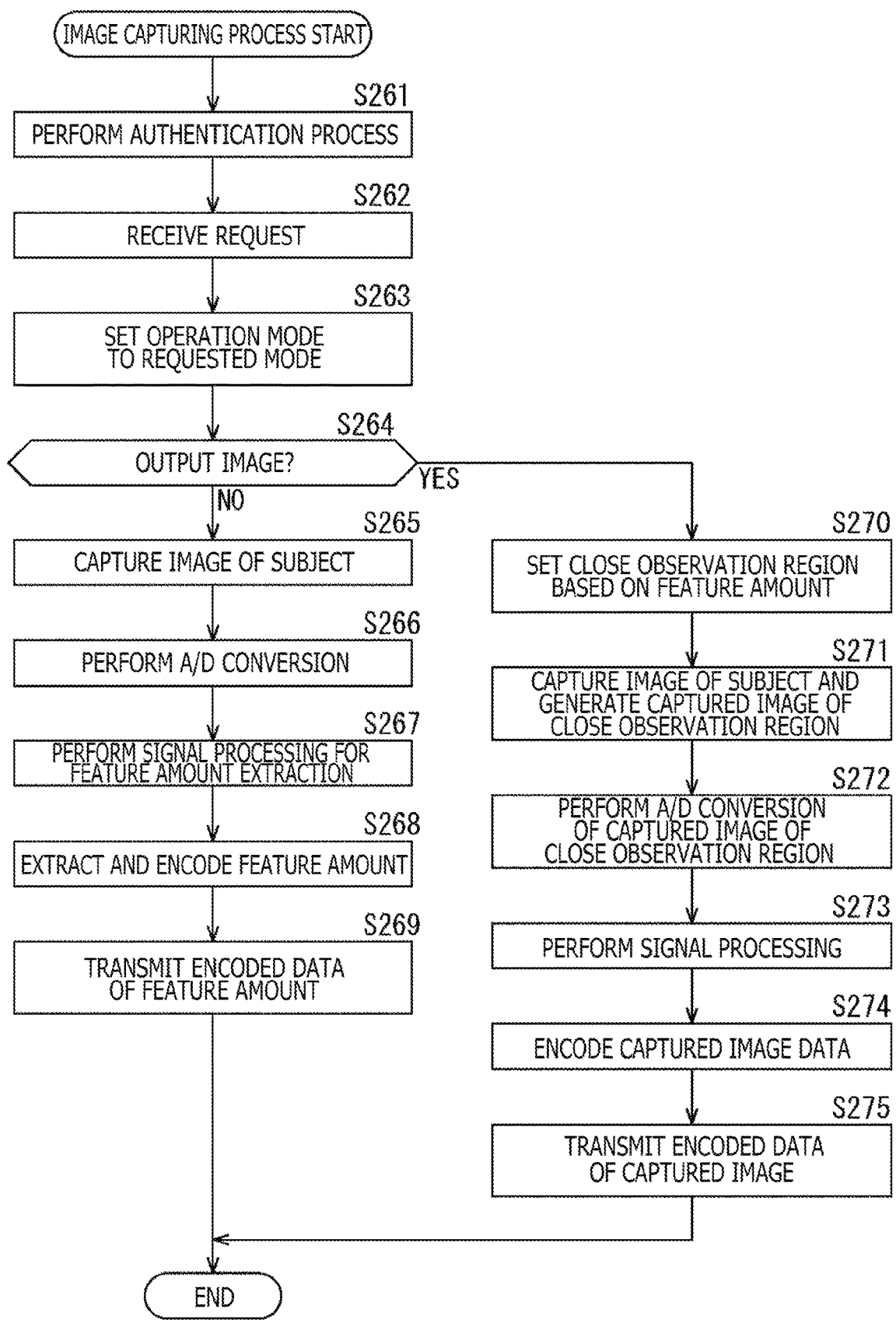
FIG. 14 is a flowchart illustrating an example of a flow of the image capturing process.

An example of the flow of the image capturing process in this case will be described with reference to the flowchart of FIG. 14. When the image capturing process is started, each process of steps S261 to S269 is executed in a similar manner to each process of steps S231 to S239.

In addition, in a case where it is determined in step S264 that the captured image is to be output, the process proceeds to step S270.

In step S270, the image drive control section 261 sets a region to be closely observed (also referred to as a close observation region) on the basis of the feature amount extracted in the past.

In step S271, the light receiving section 121 captures an image of a subject according to the control of the image drive control section 261 in step S270, and generates a captured image of the close observation region. In step S272, the ADC 122 performs A/D conversion of the captured image in the close observation region according to the control of the image drive control section 261 in step S270.

Figure 12:
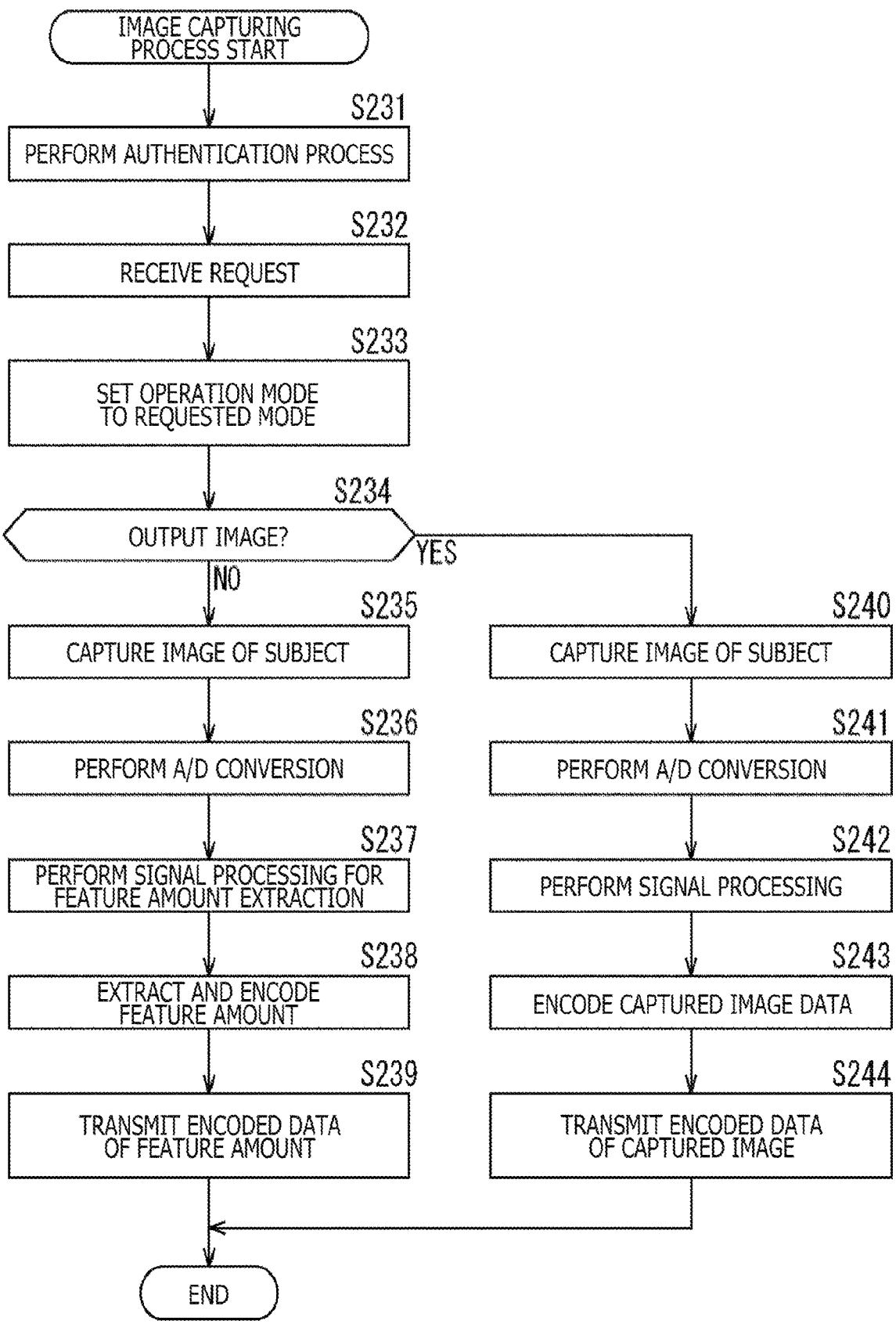
FIG. 12 is a flowchart illustrating an example of a flow of the image capturing process.

Each process of steps S273 to S275 is executed in a similar manner to each process of steps S242 to S244 (FIG. 12).

When the process of step S269 or step S275 is completed, the image capturing process ends.

By performing the image capturing process as described above, the image capturing device 101 can prevent an increase in the load.

8. Additional Statement

<Computer>

The series of processes described above can be executed by hardware or by software. In a case where a series of processes are executed by software, the programs constituting the software are installed in the computer. Here, the computer includes a computer incorporated in dedicated hardware, a general-purpose personal computer, for example, capable of executing various kinds of functions by installing various kinds of programs, or the like.

Figure 15:
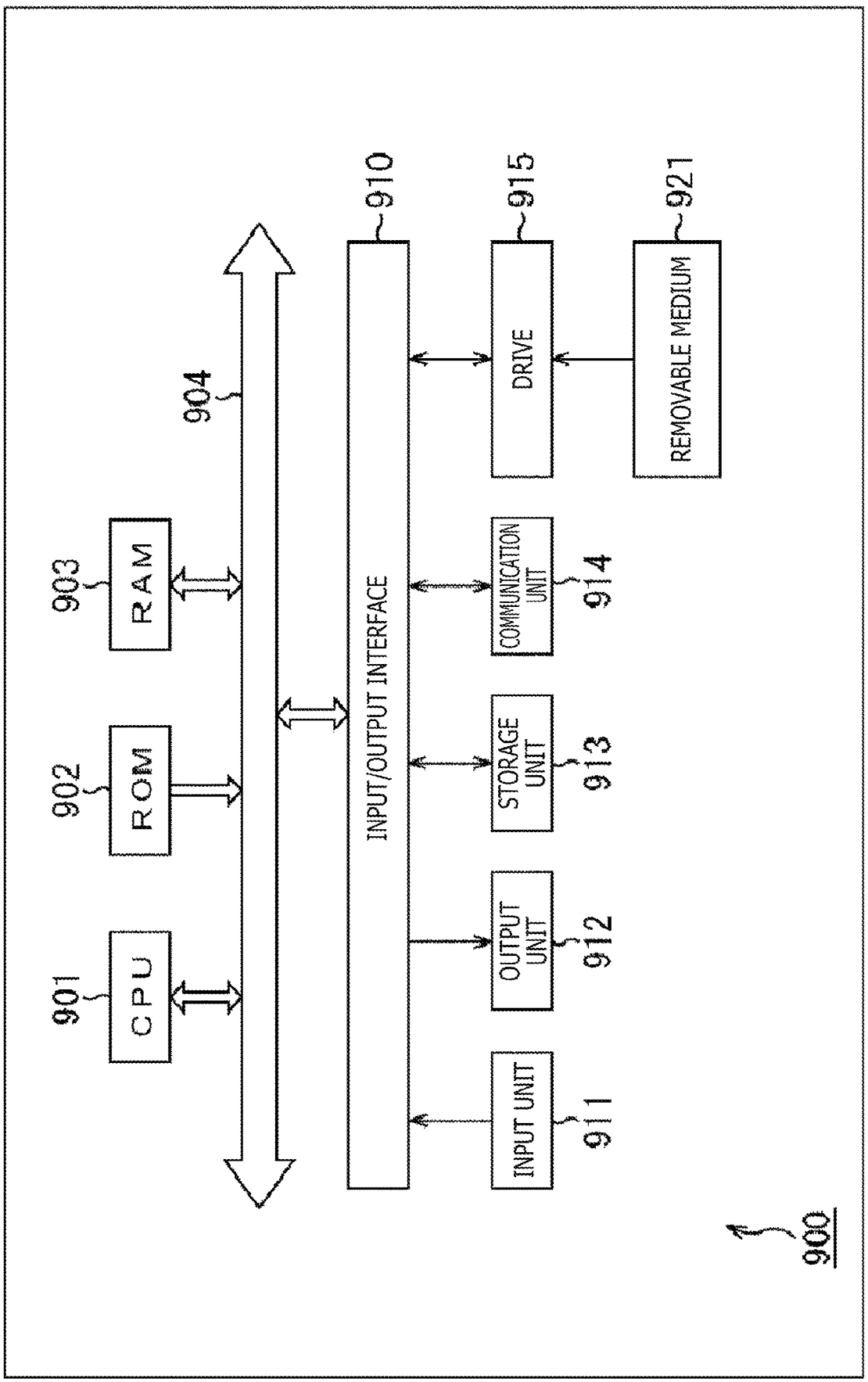
FIG. 15 is a block diagram illustrating a main configuration example of a computer.

FIG. 15 is a block diagram illustrating a configuration example of hardware of a computer that executes the above-mentioned series of processes with programs.

In a computer 900 illustrated in FIG. 15, a CPU (Central Processing Unit) 901, a ROM (Read Only Memory) 902, and a RAM (Random Access Memory) 903 are connected to one another via a bus 904.

An input/output interface 910 is also connected to the bus 904. An input unit 911, an output unit 912, a storage unit 913, a communication unit 914, and a drive 915 are connected to the input/output interface 910.

The input unit 911 includes a keyboard, a mouse, a microphone, a touch panel, an input terminal, and the like, for example. The output unit 912 includes a display, a speaker, an output terminal, and the like, for example. The storage unit 913 includes a hard disk, a RAM disk, a non-volatile memory, and the like, for example. The communication unit 914 includes a network interface, for example. The drive 915 drives a removable medium 921 such as a magnetic disk, an optical disc, a magneto-optical disk, or a semiconductor memory.

In the computer configured as described above, the CPU 901 loads the program stored in the storage unit 913, for example, into the RAM 903 via the input/output interface 910 and the bus 904 and executes the program, thereby performing the above-described series of processes. The RAM 903 also appropriately stores data and the like necessary for the CPU 901 to execute various kinds of processes.

The program executed by the computer (CPU 901) can be recorded in the removable medium 921 to be applied, which is a package medium or the like, for example. In that case, the program can be installed in the storage unit 913 via the input/output interface 910 by attaching the removable medium 921 to the drive 915.

In addition, this program can also be provided via a wired or wireless transmission medium such as a local area network, the Internet, and digital satellite broadcasting. In that case, the program can be received by the communication unit 914 and installed in the storage unit 913.

Moreover, this program can also be installed in advance in the ROM 902 or the storage unit 913.

<Applicable Target of the Present Technology>

The present technology can be applied to any image encoding/decoding method. That is, as long as it does not contradict the present technology described above, the specifications of various kinds of processes related to image encoding/decoding are optional and are not limited to the above-mentioned examples.

In addition, although the case where the present technology is applied to the image capturing device has been described above, the present technology can be applied not only to the image capturing device but also to any devices (electronic equipment). For example, the present technology can be applied also to an image processing device or the like that performs image processing on a captured image generated by another image capturing device.

In addition, the present technology can also be executed as any configuration to be mounted on an optional device or a device constituting a system, for example, as a processor as a system LSI (Large Scale Integration) or the like (for example, a video processor), a module using a plurality of processors (for example, a video module) or the like, a unit using a plurality of modules (for example, a video unit) or the like, a set in which other functions are further added to the unit (for example, a video set) or the like (namely, configuration of a part of a device).

In addition, the present technology can also be applied to a network system including a plurality of devices. For example, the present technology can also be applied to a cloud service that provides services related to images (moving images) to any terminals such as computers, AV (Audio Visual) equipment, portable information processing terminals, and IoT (Internet of Things) devices.

<Others>

In addition, various pieces of information (metadata etc.) regarding the encoded data (bit stream) may be transmitted or recorded in any form as long as the information is associated with the encoded data. Here, the term "associate" means to make the other data available (linkable) when processing one data, for example. That is, pieces of data associated with each other may be combined as one piece of data or may be individual pieces of data. For example, the information associated with the encoded data (image) may be transmitted through a transmission path different from that for the encoded data (image). In addition, for example, the information associated with the encoded data (image) may be recorded in a recording medium different from that for the encoded data (image) (or another recording area of the same recording medium). Note that this "association" may be applied to a part of the data instead of the entire data. For example, an image and information corresponding to the image may be associated with each other in any unit such as a plurality of frames, one frame, or a part within the frame.

In addition, in the present specification, terms such as "combine," "multiplex," "add," "integrate," "include," "store," "pack into," "put in," "insert" means bringing a plurality of objects together, for example, bringing encoded data and metadata into one data, and means one method of "associating" described above.

In addition, the embodiments of the present technology are not limited to the above-described embodiments, and various changes can be made without departing from the gist of the present technology.

In addition, for example, the present technology can also be executed as any configuration that constitutes a device or system, for example, as a processor as a system LSI (Large Scale Integration) or the like, a module that uses a plurality of processors or the like, a unit that uses a plurality of modules or the like, and a set in which other functions are added to the unit, or the like (namely, a part of the configuration of a device).

Incidentally, in the present specification, the system means an assembly of a plurality of constituent elements (devices, modules (components), etc.), and it does not matter whether or not all the components are in the same housing. Therefore, a plurality of devices housed in separate housings and connected to one another via a network, and a device in which a plurality of modules is housed in one housing are both systems.

In addition, for example, the configuration described as one device (or processing section) may be divided to be configured as a plurality of devices (or processing sections). On the contrary, the configurations described above as a plurality of devices (or processing sections) may be collectively configured as one device (or processing section).

Further, as a matter of course, a configuration other than the above may be added to the configuration of each device (or each processing section). Furthermore, as long as the configuration and operation of the entire system are substantially the same, a part of the configuration of one device (or processing section) may be included in the configuration of another device (or another processing section).

Moreover, for example, the present technology can have a cloud computing configuration in which one function is processed by a plurality of devices via a network in a shared and cooperative manner.

Further, for example, the above-mentioned program can be executed in any device. In that case, it is sufficient if the device has necessary functions (functional blocks etc.) and can obtain necessary information.

Furthermore, for example, each step described in the above-mentioned flowchart can be executed by one device and can also be executed by a plurality of devices in a shared manner. Moreover, in a case where one step includes a plurality of processes, the plurality of processes included in the one step can be executed by one device or can also be executed by a plurality of devices in a shared manner. In other words, a plurality of processes included in one step can be executed as processes of a plurality of steps. On the contrary, the processes described as a plurality of steps can be collectively executed as one step.

It should be noted that, in the program executed by the computer, the processing of the steps for describing the program may be executed in chronological order according to the order described in the present specification, or may be executed in parallel or individually at a necessary timing such as the time of being called. That is, as long as there is no contradiction, the processing of each step may be executed in an order different from the above-mentioned order. Further, the processing of the steps for describing this program may be executed in parallel with the processing of another program, or may be executed in combination with the processing of another program.

Incidentally, a plurality of the present techniques described in the present specification can be independently implemented alone as long as there is no contradiction. As a matter of course, any of a plurality of the present technologies can be used in combination. For example, some or all of the present techniques described in any of the embodiments may be combined with some or all of the present techniques described in other embodiments for execution. Further, some or all of any above-mentioned present techniques can also be carried out in combination with other techniques not described above.

It should be noted that the present technology can also have the following configurations.

(1) An image capturing element including:

an image capturing section that captures an image of a subject to generate a captured image; and a feature amount extracting section that extracts a predetermined feature amount to be output to an outside from the captured image generated by the image capturing section.

(2) The image capturing element described in item (1), in which the image capturing section and the feature amount extracting section are packaged and formed in respective substrates different from each other.

(3) The image capturing element described in item (2), in which
a substrate in which the image capturing section is formed and a substrate in which the feature amount extraction section is formed are superimposed on top of another.

(4) The image capturing element described in any one of items (1) to (3), further including:
a signal processing section that performs signal processing for extracting the feature amount on the captured image generated by the image capturing section, in which
the feature amount extracting section extracts the feature amount from the captured image subjected to the signal processing by the signal processing section.

(5) The image capturing element described in any one of items (1) to (4), in which
the feature amount extracting section encodes the extracted feature amount.

(6) The image capturing element described in any one of items (1) to (5), further including:
a transmitting section that transmits the feature amount extracted by the feature amount extracting section.

(7) The image capturing element described in any one of items (1) to (6), further including:
a selecting section that selects whether to output the captured image or to output the feature amount.

(8) The image capturing element described in item (7), in which
the selecting section selects, on the basis of a request from an outside of the image capturing element.

(9) The image capturing element described in item (8), further including:
an authenticating section that authenticates a request source of the request, in which
when the request source is authenticated by the authenticating section, the selecting section selects on the basis of the request.

(10) The image capturing element described in any one of items (7) to (9), further including:
an image signal processing section that performs predetermined signal processing on the captured image generated by the image capturing section; and
an encoding section that encodes the captured image subjected to the signal processing by the image signal processing section.

(11) The image capturing element described in any one of items (7) to (10), in which
when output of the captured image is chosen by the selecting section, the image capturing section generates the captured image by using a part of a photoelectric conversion region.

(12) The image capturing element described in item (11), in which
the image capturing section generates the captured image by using a part of the photoelectric conversion region within a range based on the feature amount extracted by the feature amount extracting section.

(13) An image capturing device including:
an image capturing section that captures an image of a subject to generate a captured image; and
a feature amount extracting section that extracts a predetermined feature amount to be output to an outside from the captured image generated by the image capturing section.

(14) The image capturing device described in item (13), further including:
a transmitting section that transmits the feature amount extracted by the feature amount extracting section to the outside.

(15) The image capturing device described in item (14), further including:
a header generating section that generates header information for the feature amount; and
an adding section that adds the header information generated by the header generating section to the feature amount extracted by the feature amount extracting section.

(16) A method for capturing an image, including:
generating a captured image by capturing an image of a subject; and
extracting a predetermined feature amount to be output to an outside from the generated captured image.

REFERENCE SIGNS LIST

100 Communication system
101 Image capturing device
102 Cloud
111 Optical system
112 Image capturing element
121 Light receiving section
122 ADC
123 Feature amount extraction signal processing section
124 Feature amount extraction encoding section
125 Transmitting section
131 Receiving section
132 Data analysis processing section
171 and 172 Semiconductor substrate
180 Image capturing device
181 Header generating section
182 Adding section
183 Transmitting section
201 Reception device
202 Image display device
211 Control section
212 Selecting section
213 Signal processing section
214 Encoding section
215 Selecting section
231 Authenticating section
261 Image drive control section

The invention claimed is:

1. An image capturing element, comprising:
an image capturing section configured to capture an image of a subject to generate a captured image;
a feature amount extracting section configured to extract a specific feature amount to be output to an outside from the captured image;
a selecting section configured to select, based on a request from an outside of the image capturing element, one of to output the captured image or to output the feature amount; and
an authenticating section configured to authenticate a request source of the request, wherein
when the request source is authenticated by the authenticating section, the selecting section is further configured to select based on the request.

2. Image capturing element according to claim 1, wherein the image capturing section is in a first substrate and the feature amount extracting section is in a second substrate different from the first substrate.

3. The image capturing element according to claim 2, wherein one of the first substrate and the second substrate is superimposed on top of the other of the first substrate and the second substrate.

4. The image capturing element according to claim 1, further comprising:
a signal processing section configured to perform signal processing to extract the feature amount on the captured image, wherein
the feature amount extracting section configured to extract the feature amount from the captured image subjected to the signal processing.

5. The image capturing element according to claim 1, wherein the feature amount extracting section is further configured to encode the extracted feature amount.

6. The image capturing element according to claim 1, further comprising:
a transmitting section configured to transmit the extracted feature amount.

7. The image capturing element according to claim 1, further comprising:
an authenticating section configured to authenticate a request source of the request, wherein
when the request source is authenticated by the authenticating section, the selecting section is further configured to select based on the request.

8. The image capturing element according to claim 1, wherein when output of the captured image is chosen by the selecting section, the image capturing section is further configured to generate the captured image based on a part of a photoelectric conversion region.

9. The image capturing element according to claim 8, wherein the image capturing section is further configured to generate the captured image by use of a part of the photoelectric conversion region within a range based on the extracted feature amount.

10. An image capturing device, comprising:
an image capturing section configured to capture an image of a subject to generate a captured image;
a feature amount extracting section configured to extract a specific feature amount to be output to an outside from the captured image;
a transmitting section is further configured to transmit the extracted feature amount to the outside; and
a header generating section configured to generate header information for the feature amount; and
an adding section configured to add the generated header information to the extracted feature amount.

11. A method for capturing an image, comprising:
generating a captured image by capturing an image of a subject; and
extracting a specific feature amount to be output to an outside from the generated captured image
selecting, based on a request from an outside of the image capturing element, one of to output the captured image or to output the feature amount; and
authenticating a request source of the request; and
selecting based on the request when the request source is authenticated.

* * * * *